(12) United States Patent
Robbins et al.

(10) Patent No.: US 8,521,767 B2
(45) Date of Patent: Aug. 27, 2013

(54) APPARATUS AND METHOD FOR ENTERING CONTACT INFORMATION IN A CONTACT BOOK

(75) Inventors: William S. Robbins, Sun Prairie, WI (US); R. Tyler Wallis, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 411 days.

(21) Appl. No.: 12/335,187

(22) Filed: Dec. 15, 2008

(65) Prior Publication Data

US 2010/0153462 A1    Jun. 17, 2010

(51) Int. Cl.
*G06F 17/30*    (2006.01)

(52) U.S. Cl.
USPC .......................................... 707/769; 707/770

(58) Field of Classification Search
None
See application file for complete search history.

(56) References Cited

U.S. PATENT DOCUMENTS

| | | | |
|---|---|---|---|
| 6,738,462 B1 | 5/2004 | Brunson | |
| 6,782,086 B2 | 8/2004 | Clapper | |
| 7,187,932 B1 | 3/2007 | Barchi | |
| 2004/0093317 A1* | 5/2004 | Swan | 707/1 |
| 2004/0192299 A1* | 9/2004 | Wilson et al. | 455/433 |
| 2005/0157857 A1 | 7/2005 | Lockwood | |
| 2006/0177039 A1 | 8/2006 | Caballero-McCann et al. | |
| 2008/0261568 A1* | 10/2008 | Lopez et al. | 455/414.1 |

OTHER PUBLICATIONS

"BlackBerry Wireless Handheld User Guide", 2004 Research in Motion Limited, Part No. PDF-07490-001, 144 Pages.*
Robbins et al., "Method and Apparatus for Presenting Communication Identifiers", U,S, Appl. No. 12/059,920, dated Mar. 31, 2008; 34 pages.
Robbins et al., "Method and Apparatus for Selecting Communication Identifiers", U.S. Appl. No. 12/113,394, dated May 1, 2008; 35 pages.

* cited by examiner

*Primary Examiner* — Hung Q Pham
(74) *Attorney, Agent, or Firm* — Guntin & Gust, PLC; Jay H. Anderson

(57) ABSTRACT

A system that incorporates teachings of the present disclosure may include, for example, a communication device having a controller to present a new contact book entry of a contact book, detect an entry of a communication identifier of a party in one of a plurality of fields of the new contact book entry, search for contact information associated with the party in a reverse directory lookup database operating externally to the communication device using the communication identifier of the party, detect an entry in the reverse directory lookup database with additional contact information of the party, receive from the reverse directory lookup database the additional contact information of the party, and populate one or more additional fields of the new contact book entry with one or more portions of additional contact information according to their corresponding one or more tags. Other embodiments are disclosed.

22 Claims, 9 Drawing Sheets

800

US 8,521,767 B2

APPARATUS AND METHOD FOR ENTERING CONTACT INFORMATION IN A CONTACT BOOK

FIELD OF THE DISCLOSURE

The present disclosure relates generally to communication techniques and more specifically to a apparatus and method for entering contact information in a contact book.

BACKGROUND

Contact books are commonly used to store names and contact information of interested parties. Typically, a user creates a new contact book entry in a contact book by selecting a graphical user interface (GUI) button that invokes this task. The new contact book entry is presented by a computing device as a GUI with fields such as name, job title, company name, office number, home number, mobile number, email address, instant messaging address, and so on. Some contact books can also store a picture that is associated with the party listed in the contact book entry.

DETAILED DESCRIPTION

One embodiment of the present disclosure can entail a communication device having a controller to present a new contact book entry of a contact book, detect an entry of a communication identifier of a party in one of a plurality of fields of the new contact book entry, search for contact information associated with the party in a reverse directory lookup database operating externally to the communication device using the communication identifier of the party, detect an entry in the reverse directory lookup database with additional contact information of the party, receive from the reverse directory lookup database the additional contact information of the party, and populate one or more additional fields of the new contact book entry with one or more portions of additional contact information according to their corresponding one or more tags.

Another embodiment of the present disclosure can entail a computer-readable storage medium can have computer instructions to enter a communication identifier of a party in one of a plurality of fields of a new contact book entry of a contact book, search for contact information of the party in a device operating externally to the storage medium using the communication identifier of the party, detect additional contact information of the party stored in the device, receive from the device the additional contact information of the party, and populate one or more additional fields of the new contact book entry with the additional contact information of the party Yet another embodiment of the present disclosure can entail a storage device having a controller to receive from a communication device a communication identifier associated with a party, retrieve contact information of the party according to the communication identifier, and transmit to the communication device the contact information, wherein the communication device is adapted to transmit the communication identifier to the storage device responsive to detecting an entry of the communication identifier in a field of a contact book.

Another embodiment of the present disclosure can entail requesting a reverse directory lookup of a communication identifier at a remote site while detecting an entry of the communication identifier in a contact book.

Figure 1:
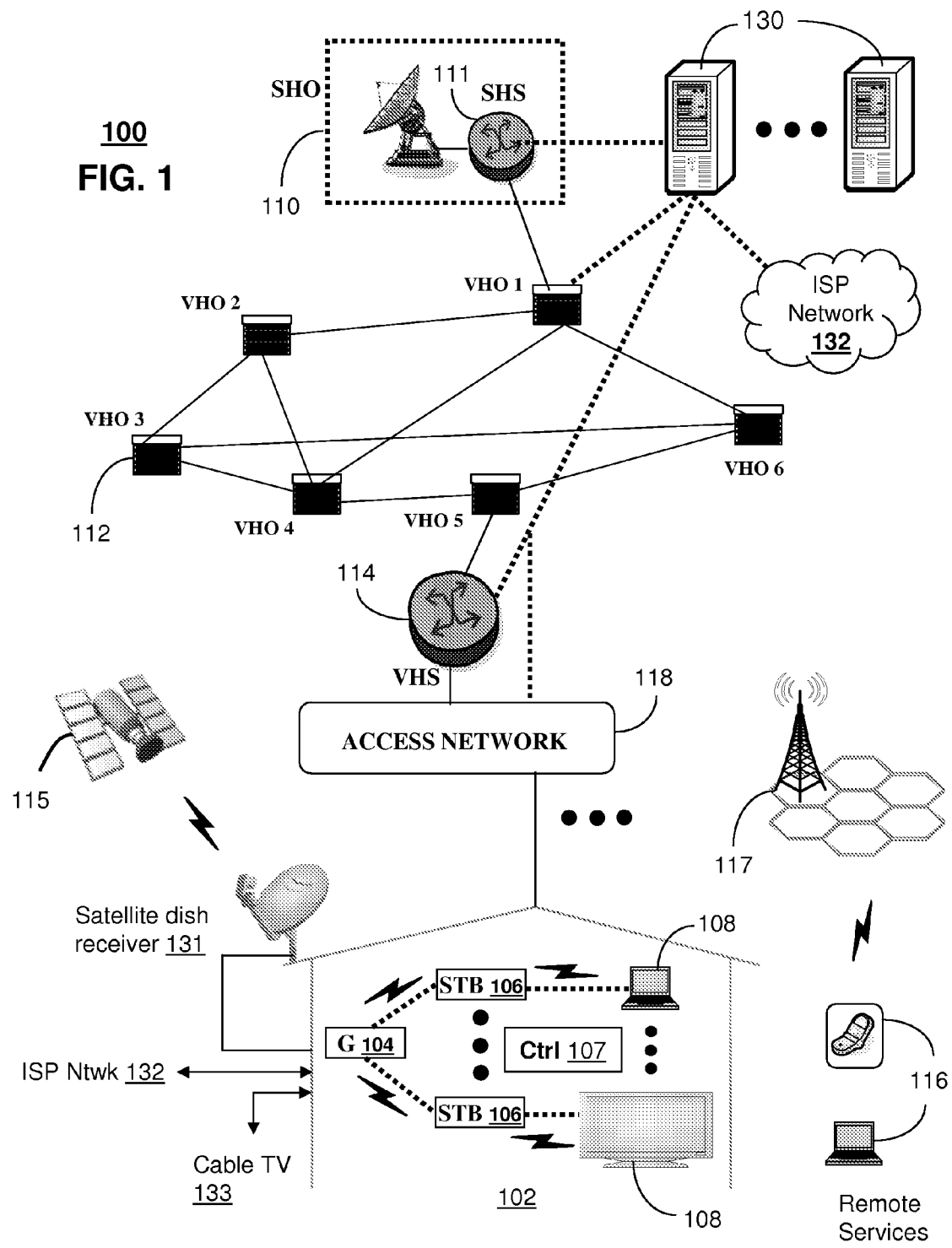
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can be utilized as a reverse directory lookup database (herein referred to as RDL_DB 130) operating as a server that remotely provides reverse directory lookup services to the communication devices of communication system 100 as well as other communication devices of other communication systems. The communication devices and the RDL_DB 130 are therefore separate devices operating remotely from each other. The RDL_DB 130 can utilize common database technology store subscriber information.

The subscriber information can include a name of a party, an address of the party, a landline phone number of the party, a mobile phone number of the party, an email address of the party, a session initiation protocol uniform resource identifier (SIP URI) of the party, an instant messaging address of the party, a short messaging system (SMS) address of the party, and a multimedia messaging system (MMS) address of the party, just to mention a few. The RDL_DB 130 can be accessed by the communication devices of FIG. 1 as will be described by way of the illustrative method 500 of FIG. 5.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
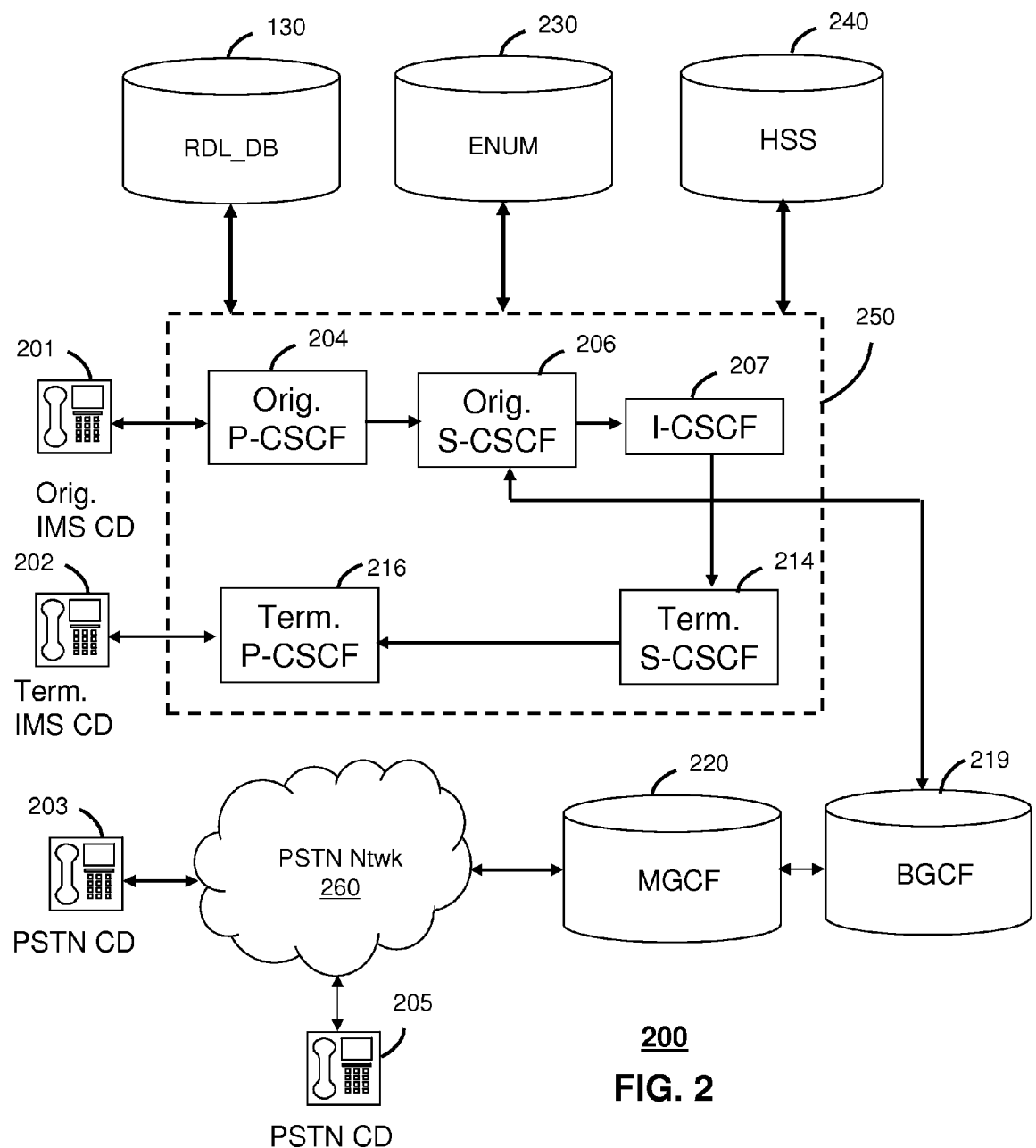

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The RDL_DB 130 of FIG. 1 can be operably coupled to the second communication system 200 for purposes similar to those described above.

Figure 3:
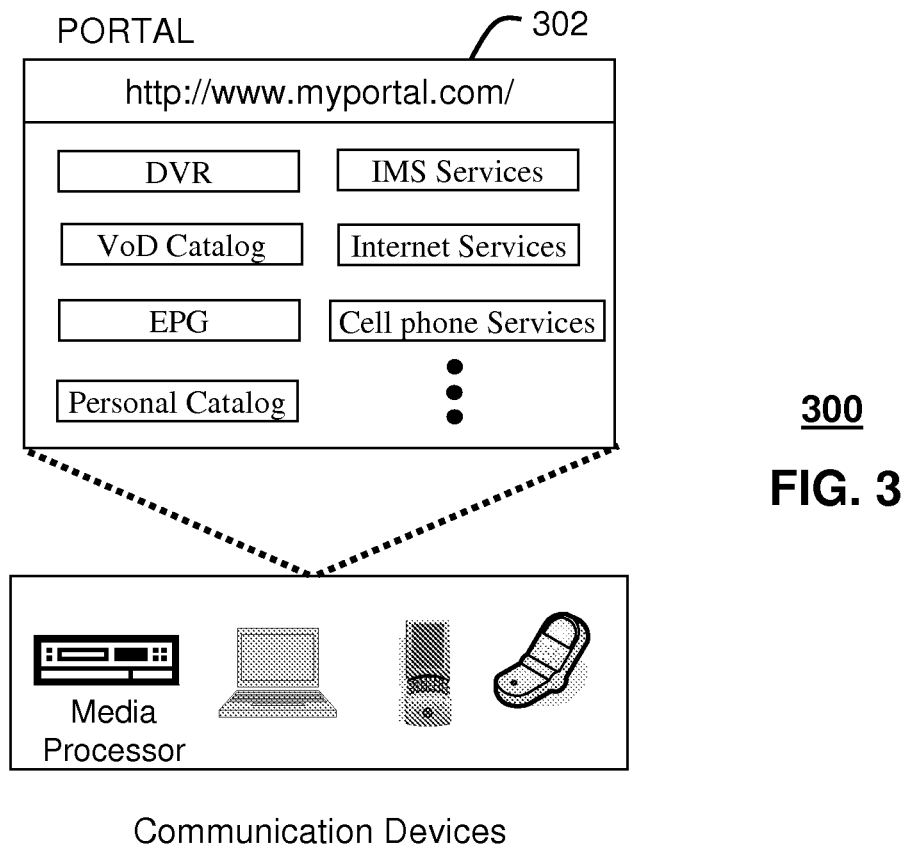
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
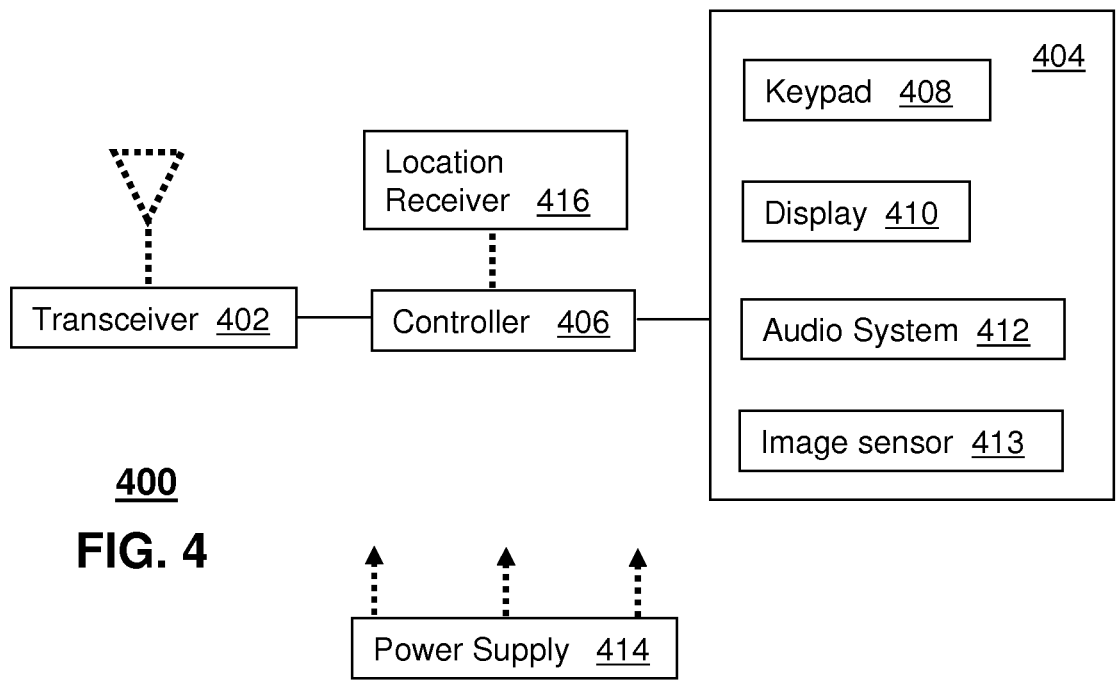
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable)

or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
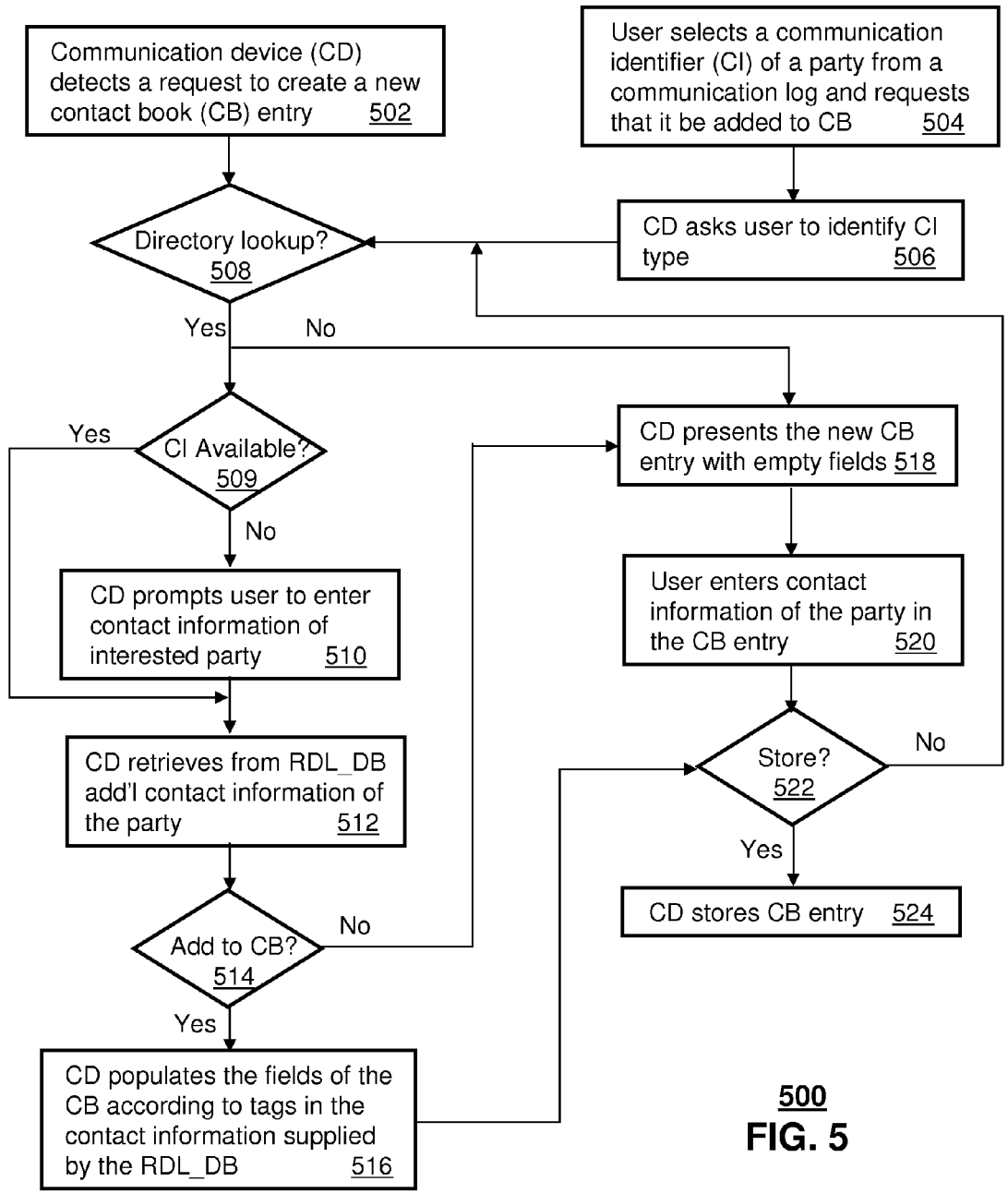
FIG. 5 depicts an illustrative embodiment of a method according to the present disclosure.
Figure 6:
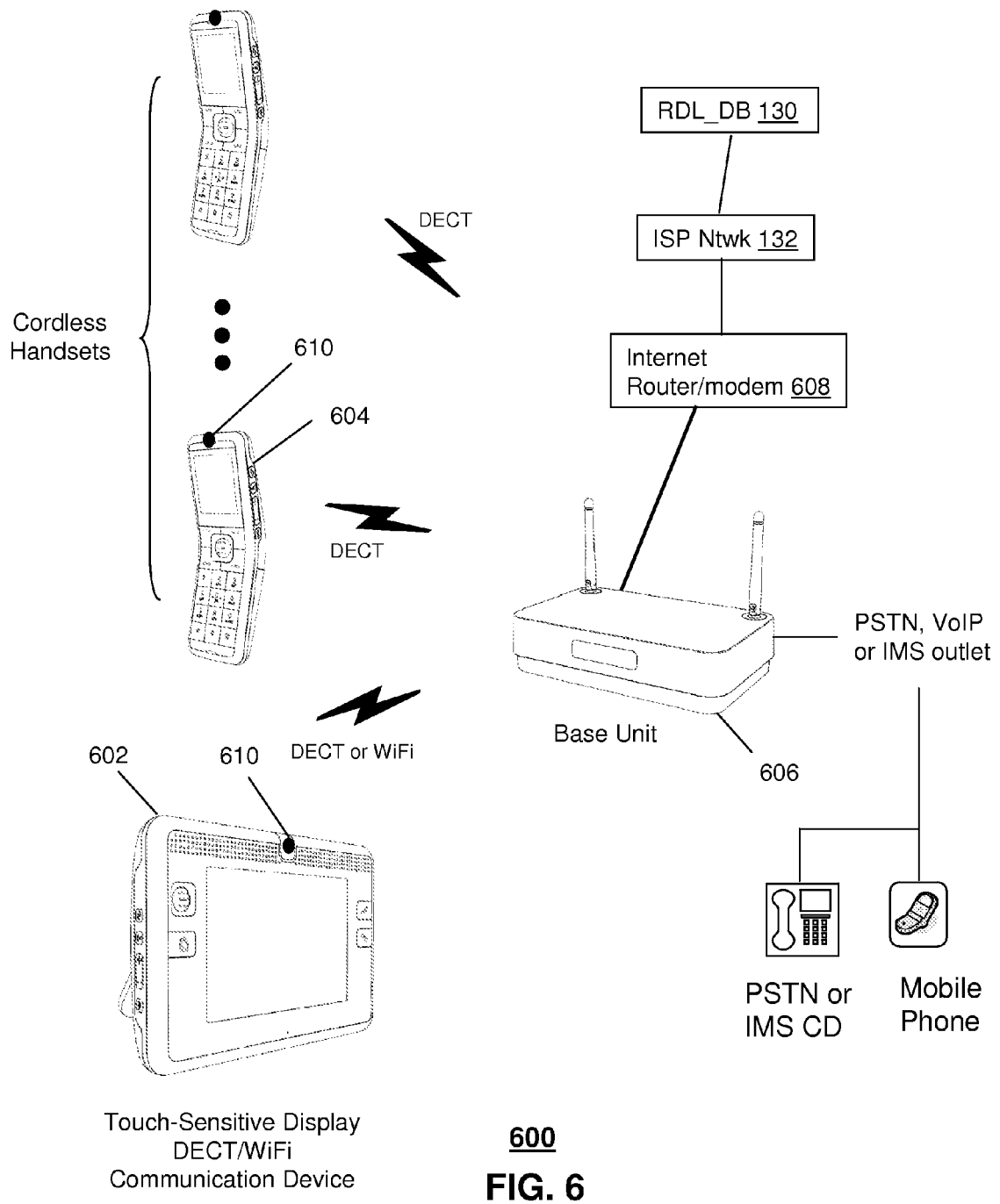
FIGS. 6-9 depict illustrative embodiments of the method of FIG. 5.

FIG. 5 depicts an illustrative a method 500 operating in portions of the aforementioned communication systems. FIG. 6 shows an illustrative embodiment of communication devices operating according to method 500. Block diagram 600 comprises a landline communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the ISP network 132 and the RDL_DB 130. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures.

With the configuration of FIG. 6 in mind, method 500 can begin with step 502 in which a user enters by way of a user interface of a communication device such as the touch-sensitive display of the tablet 602 a request to create a new contact book entry of a contact book operating in the tablet. In this step, the user can be viewing a graphical user interface (GUI) of the contact book 702, which shows a number of contact book entries. The contact book 702 can be invoked by the user by selecting a menu option or button presented by a main GUI of an operating system of the tablet 602. The user can edit any one of the contact book entries by selection (e.g., double clicking a selection with a mouse pointer), or instead create a new contact book entry by selecting GUI button 704.

In another embodiment, the user can be viewing a communication log 706 which can also be invoked by a menu selection from the main GUI of the operating system operating in the tablet 602. In this embodiment, the user can select by mouse navigation techniques a communication identifier 708 and request that the communication identifier be added to the contact book by selecting in GUI button 710. In step 506, the tablet 602 can prompt the user with a query 712 requesting that the user identify the type of communication identifier selected (home number, office number, mobile, email address, IM address, SIP URI, etc.). This step directs the tablet 604 to place the selected communication identifier in a corresponding field of the contact book. For example, if the user selects home phone number, the tablet 602 knows to populate the home phone number field of the new contact book entry once this GUI is presented.

Figure 8:
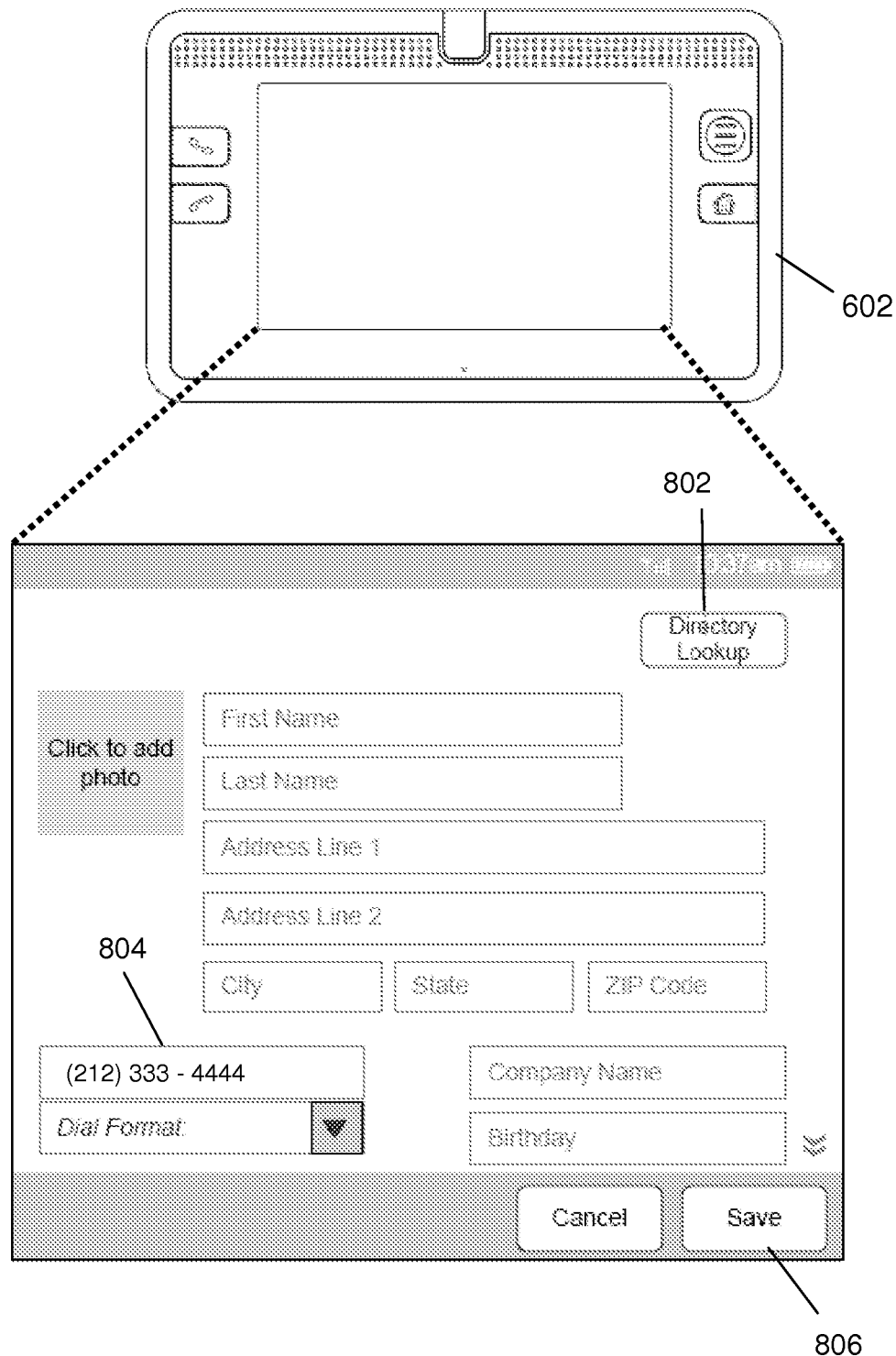

From step 502 or step 506, the tablet 602 can present another query 714 to the user to determine if the user would like to conduct a reverse directory lookup. If the user rejects the offer, the tablet 602 proceeds to step 518 where it presents the new contact book entry with a plurality of unpopulated fields as shown in FIG. 8 (and a pre-populated field if in step 506 the user identified the type of communication identifier selected in step 504). In step 520, the user can manually enter in one or more of the fields contact information of a party. The contact information entered can represent a name of the party, an address of the party, a landline phone number of the party, a mobile phone number of the party, an email address of the party, a SIP URI of the party, an instant messaging address of the party, a short messaging system (SMS) address of the party, and a multimedia messaging system (MMS) address of the party, just to mention a few.

Once the user is satisfied with the contact information entered in the fields of the new contact book entry, the user can choose to store the information entered by selecting a Save GUI button 806. If the user makes this selection, the tablet 602 proceeds to step 524 where it stores the new contact book entry with the populated fields in memory. If the user does not select the Save button 806, the tablet 602 can return to step 508 to determine if a reverse directory lookup is requested by the user by the selection of a Directory Lookup button 802 while the GUI of FIG. 8 is presented.

Figure 7:
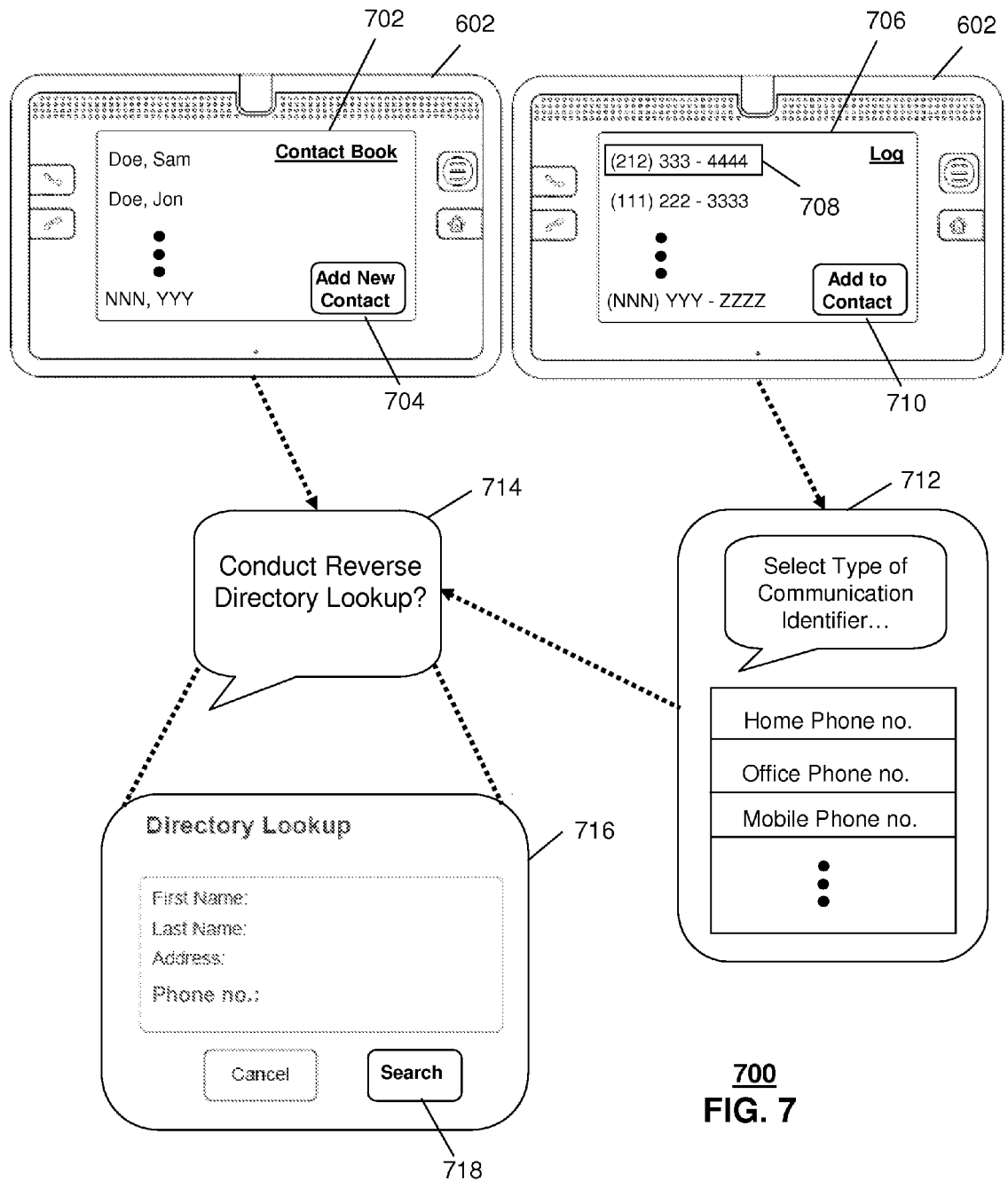
Figure 9:
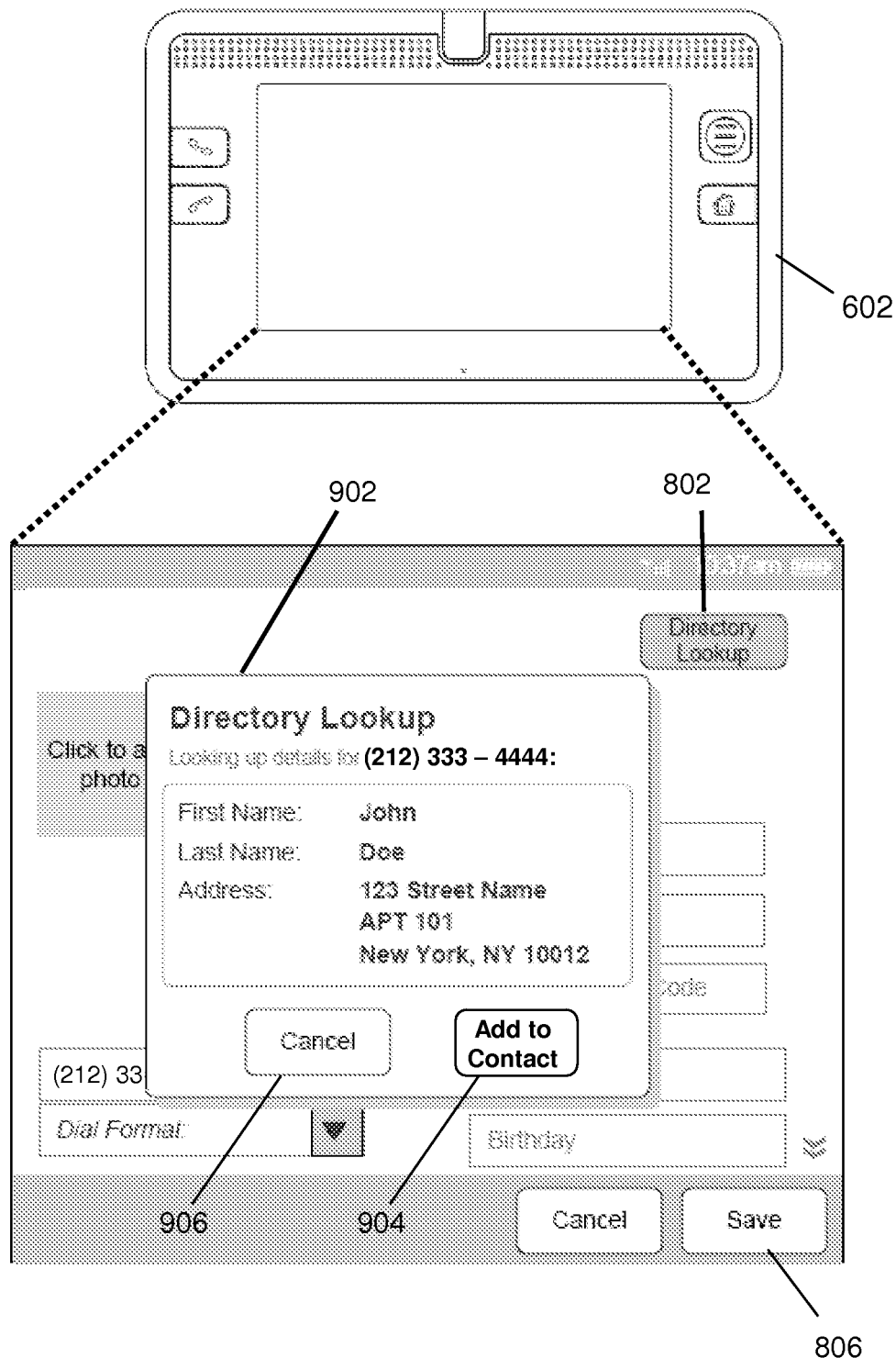

If this button is selected, the tablet 602 can proceed to step 509 where it determines if contact information of the party has been provided. If contact information has not been provided (i.e., the new contact book entry is empty), the user can be presented in step 510 a reverse directory lookup GUI such as reference 716 of FIG. 7. In this step, the user can add a party's name, address, phone number or other form of identification of the party (e.g., email address, IM address, etc.) to perform a reverse directory lookup by way of the RDL_DB 130. Once the user has entered contact information in GUI 716, the user can select GUI button 718 to initiate in step 512 the search at the RDL_DB 130 according to the contact information provided in the GUI 716. Any additional contact information found in step 512 by the RDL_DB 130 can be supplied to the tablet 602. The tablet 602 in turn can present a populated GUI 902 with the search results as shown in FIG. 9. It should be noted that if in step 509 the tablet 602 detects that a communication identifier was provided such as the communication identifier 804 shown by way of example in FIG. 8, the tablet 602 can skip step 510 and proceed to step 512 where it retrieves from the RDL_DB 130 additional contact information of the party and presents the information in GUI 902.

The user can accept the search results in step 514 by selecting the Add to Contact button 904 which can automatically populate in step 516 the fields of the contact book. If the user chooses to ignore the results of the search by selecting a Cancel GUI button 906, said selection can direct the tablet 602 to step 518 where it presents the new contact book entry with empty fields for manual entry by the user. Suppose, however, that the user selects the Add to Contact GUI button 904, which directs the tablet 602 to step 516 where it automatically populates the fields of the contact book. This step can be performed with tagging information supplied by the RDL_DB 130.

That is, portions of the additional contact information supplied by the RDL_DB 130 can come with tags to identify associations with the fields of the contact book. For example, suppose the user entered a phone number to be searched. Further suppose the RDL_DB 130 located the party's name associated with the phone number, the address of the party, the mobile number of the party, and the email address of the party. The RDL_DB 130 can supply this additional contact information with tags to identify the portion having to do with the party's name, the portion having to do with the mobile number and the portion having to do with the email address. With these tagged portions, the tablet 602 can section each portion of the contact information supplied by the RDL_DB 130, and thereby populate the fields of the contact book accordingly. Tagging can be performed with headers that identify the beginning an end of a portion, and the type of contact information provided (party name, mobile number, etc.). Once the fields have been populated in step 516, the tablet 602 can proceed to step 522 where it waits for the user to select the Save button 806 and thereby record the populated fields of the contact book in step 524 as previously described.

Upon reviewing the aforementioned embodiments, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 10:
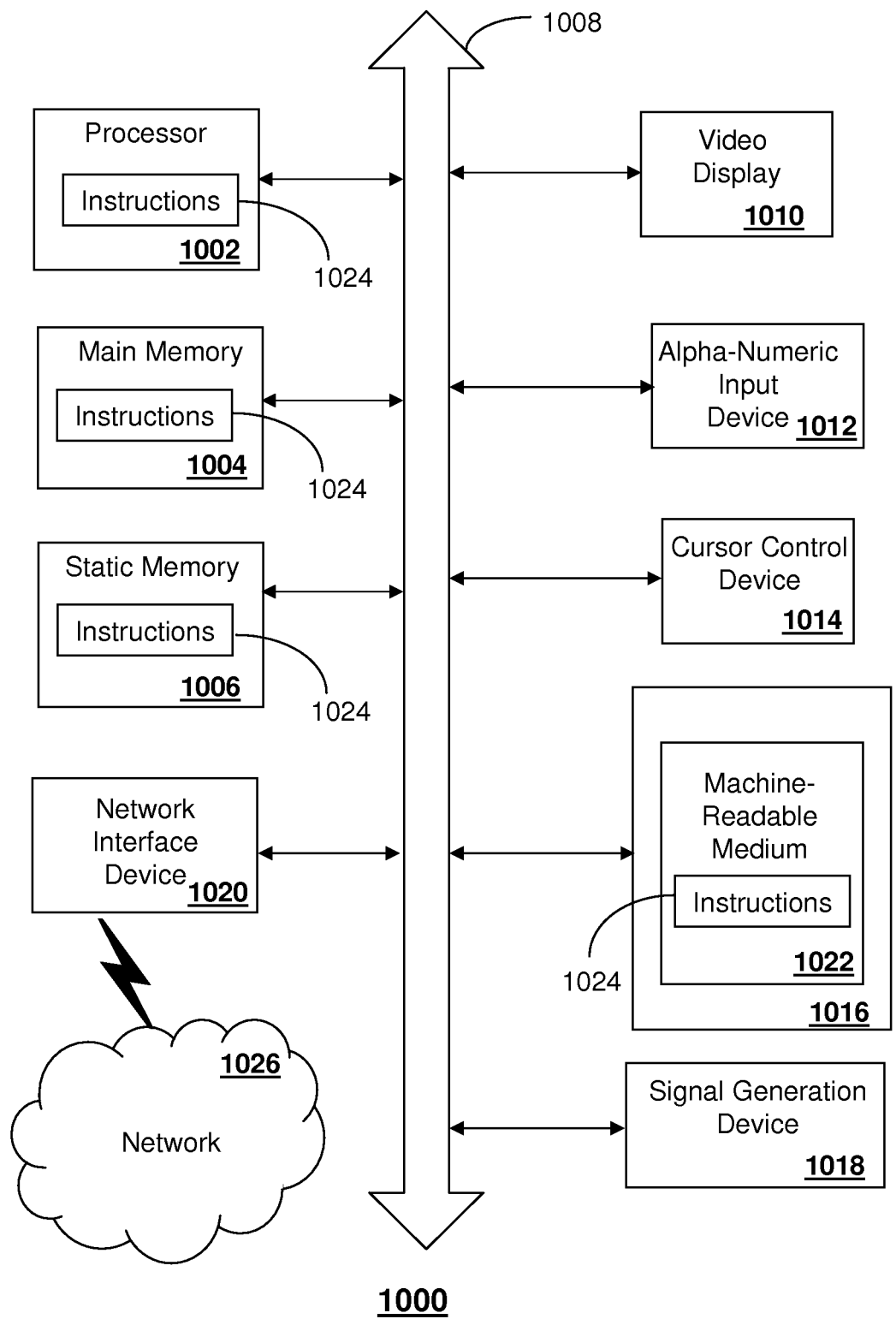
FIG. 10 is a diagrammatic representation of a machine in the form of a computer system within which a set of instructions, when executed, may cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a memory to store instructions; and
   a controller device coupled with the memory, wherein the controller device responsive to executing the instructions performs operations comprising:
   presenting a communication log comprising a communication identifier of a target communication device of a party;
   presenting a new contact book entry of a contact book responsive to a selection of the communication identifier from the communication log and a request for the new contact book entry;
   receiving a first user input for identifying an identifier type of the communication identifier;
   presenting a query prompting a second user input to determine whether to perform a reverse directory lookup;
   responsive to the second user input to perform the reverse directory lookup, transmitting a first request to conduct a search for contact information associated with the party in a reverse directory lookup database operating externally to the communication device using the communication identifier of the party, wherein the reverse directory lookup database comprises a plurality of servers in a distributed system;
   responsive to the second user input not to perform the reverse directory lookup, pre-populating a field in a plurality of fields of the new contact book entry with the communication identifier and the identifier type and receiving a third user input of contact data for the party in the plurality of fields of the new contact book entry, wherein the contact data includes a name, an address, an email address or an instant message address;
   responsive to the third user input of the contact data for the party, transmitting a second request to conduct a search for the contact information associated with the party in the reverse directory lookup database using the contact data;
   receiving from the reverse directory lookup database additional contact information of the party in response to the first request or the second request, the additional contact information comprising tags corresponding to portions of the additional contact information for associating the portions to the plurality of fields of the contact book, wherein the additional contact information of the reverse directory lookup database is subscriber data generated and maintained by a service provider associated with the reverse directory lookup database; and
   populating an additional field of the new contact book entry with a portion of additional contact information according to a tag corresponding to the portion, wherein the tag includes a header identifying a beginning and an end of the portion of additional contact information for populating the additional field.

2. The communication device of claim 1, wherein the operations further comprise presenting the additional populated fields of the new contact book entry, and wherein the additional contact information of the party is received from the reverse directory lookup database directly in response to the first request or the second request without seeking approval of the party.

3. The communication device of claim 1, wherein the controller device transmits the first request or the second request and receives the additional contact information wirelessly via a cordless phone base station that is coupled with the internet, and wherein the operations further comprise storing the new contact book entry with the communication identifier entered in the field and the additional populated fields.

4. The communication device of claim 1, wherein the reverse directory lookup database is operating in an internet protocol multimedia subsystem that includes a home subscriber server, a telephone number mapping server, a proxy call session control function server, a serving call session control function server and a media gateway control function server.

5. The communication device of claim 4, wherein the operations further comprise:
presenting a query to select one of the plurality of fields in the new contact book entry for entering the communication identifier;
detecting a selection of the field; and
entering the communication identifier in the selected field.

6. The communication device of claim 4, wherein the operations further comprise:
detecting a tag associated with the communication identifier; and
entering the communication identifier in the field identified by the tag.

7. The communication device of claim 1, wherein the operations further comprise detecting while presenting the new contact book entry the first user input.

8. The communication device of claim 1, wherein the operations further comprise detecting the entry of the communication identifier by way of a keypad or keyboard of the communication device.

9. The communication device of claim 1, wherein the communication device comprises a set-top box.

10. The communication device of claim 1, wherein the additional contact information comprises a name of the party, an address of the party, a landline phone number of the party, a mobile phone number of the party, an email address of the party, a session initiation protocol uniform resource identifier of the party, an instant messaging address of the party, a short messaging system address of the party, or a multimedia messaging system address of the party, and wherein the communication device is operable in a public switched telephone network communication system, a voice over internet protocol communication system, an internet protocol television communication system, a cable television communication system, a satellite television communication system, or an internet protocol multimedia subsystem communication system.

11. A non-transitory computer-readable storage medium, comprising instructions which when executed by a processor cause the processor to perform operations comprising:
presenting a communication log comprising a communication identifier of a target communication device of a party;
presenting a new contact book entry of a contact book responsive to a selection of the communication identifier and a request for the new contact book entry;
receiving a first user input for identifying an identifier type of the communication identifier;
presenting a query prompting a second user input to determine whether to conduct a search for contact information;
responsive to the second user input to conduct the search, transmitting a first request to search for contact information of the party in a device operating externally to the storage medium using the communication identifier of the party;
responsive to the second user input not to conduct the search, pre-populating a field in a plurality of fields of the new contact book entry with the communication identifier and the identifier type and receiving a third user input of contact data for the party, wherein the contact data includes a name, an address, an email address or an instant message address;
entering the contact data of the party in the plurality of fields of the new contact book entry of the contact book;
responsive to the third user input of the contact data for the party, transmitting a second request to conduct a search for the contact information of the party in the device using the contact data;
receiving from the device additional contact information of the party in response to the first request or the second request, wherein the additional contact information is subscriber data generated and maintained by a service provider operating the device; and
populating an additional field of the new contact book entry with the additional contact information of the party utilizing a header included with the additional contact information identifying a beginning and an end of a portion of the additional contact information for populating the additional field with the portion of the additional contact information.

12. The non-transitory computer-readable storage medium of claim 11, wherein the operations further comprise:
presenting the additional populated field of the contact book; and
storing the new contact book entry with the communication identifier entered in the field and the additional populated field, wherein the additional contact information is received from the device directly in response to the first request or the second request without seeking approval of the party, wherein the first request or the second request is wirelessly transmitted from, and the additional contact information is wirelessly received by, a tablet via a cordless phone base station that is coupled with the internet utilizing a first protocol and that provides the tablet with voice communication services utilizing a second protocol that is different from the first protocol.

13. The non-transitory computer-readable storage medium of claim 11, wherein the operations further comprise creating the new contact book entry responsive to a detected request or a selection of the communication identifier from a communication log.

14. The non-transitory computer-readable storage medium of claim 13, comprising computer instructions to present a query to select a field in the new contact book entry for entering the communication identifier.

15. The non-transitory computer-readable storage medium of claim 14, wherein the operations further comprise:
detecting a selection of the field; and
entering the communication identifier in the field responsive to the selection.

16. The non-transitory computer-readable storage medium of claim 11, wherein the additional contact information comprises a name of the party, an address of the party, a landline phone number of the party, a mobile phone number of the party, an email address of the party, a session initiation protocol uniform resource identifier of the party, an instant messaging address of the party, a short messaging system address of the party or a multimedia messaging system address of the party.

17. The non-transitory computer-readable storage medium of claim 11, wherein the storage medium operates in a communication device, and wherein the communication device comprises a landline phone, a mobile phone, a computer or a set-top box.

18. The non-transitory computer-readable storage medium of claim 11, wherein the storage medium is operable in a public switched telephone network communication system, a voice over internet protocol communication system, an internet protocol television communication system, a cable television communication system, a satellite television communication system or an internet protocol multimedia subsystem communication system.

19. The non-transitory computer-readable storage medium of claim 11, wherein the communication identifier corresponds to an E.614 number, a session initiation protocol uniform resource identifier, an email address, an instant messaging address, an short messaging system address or an multimedia messaging system address.

20. A server, comprising:
a memory to store instructions; and
a controller device coupled with the memory, wherein the controller device responsive to executing the instructions performs operations comprising:
receiving, via a communication device, a selection from a communication log of a communication identifier of a target communication device associated with a party and a first user input for identifying an identifier type of the communication identifier;
presenting, via the communication device, a query prompting a second user input to determine whether to conduct a search for contact information;
responsive to the second user input not to conduct the search, pre-populating a field in a plurality of fields of a new contact book entry with the communication identifier and the identifier type and receiving from the communication device a third user input of contact data of the party, wherein the contact data comprises a name, an address, an email address or an instant message address;
responsive to the second user input to conduct the search, retrieving contact information of the party according to the communication identifier, wherein the contact information is subscriber data generated and maintained by a service provider associated with the controller device; and
transmitting to the communication device the contact information including a header for identifying a beginning and an end of a portion of the contact information, enabling the communication device to populate an additional field of the contact book entry with the portion of the contact information, wherein the communication device is adapted to transmit the contact data or the communication identifier to the controller device responsive to detecting an entry of the communication identifier or the contact data in a field of the contact book entry.

21. The server of claim 20, wherein the controller device corresponds to a reverse directory lookup database operating externally to the communication device, and wherein the contact information is transmitted to the communication device without requesting approval of the party.

22. The server of claim 20, wherein the communication identifier corresponds to an E.614 number, a session initiation protocol uniform resource identifier, an email address, an instant messaging address, a short messaging system address or a multimedia messaging system address, wherein the contact information retrieved from a storage device corresponds to additional contact information of the party, and wherein the additional contact information comprises a name of the party, an address of the party, a landline phone number of the party, a mobile phone number of the party, an email address of the party, a session initiation protocol uniform resource identifier of the party, an instant messaging address of the party, a short messaging system address of the party or a multimedia messaging system address of the party.

* * * * *